Figure 22:
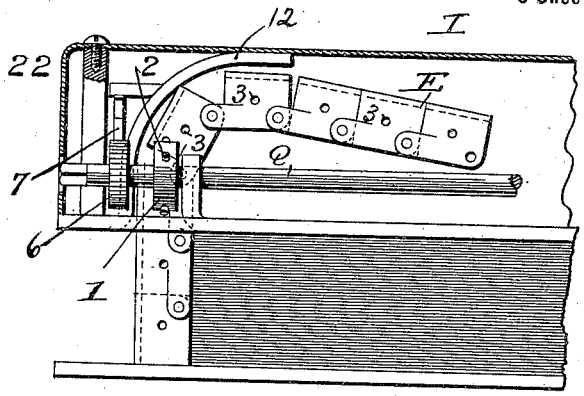

No. 690,859. Patented Jan. 7, 1902.
H. H. HOFFMANN.
BINDER.
(Application filed Aug. 23, 1897. Renewed Aug. 29, 1901.)
(No Model.)
5 Sheets—Sheet 1.
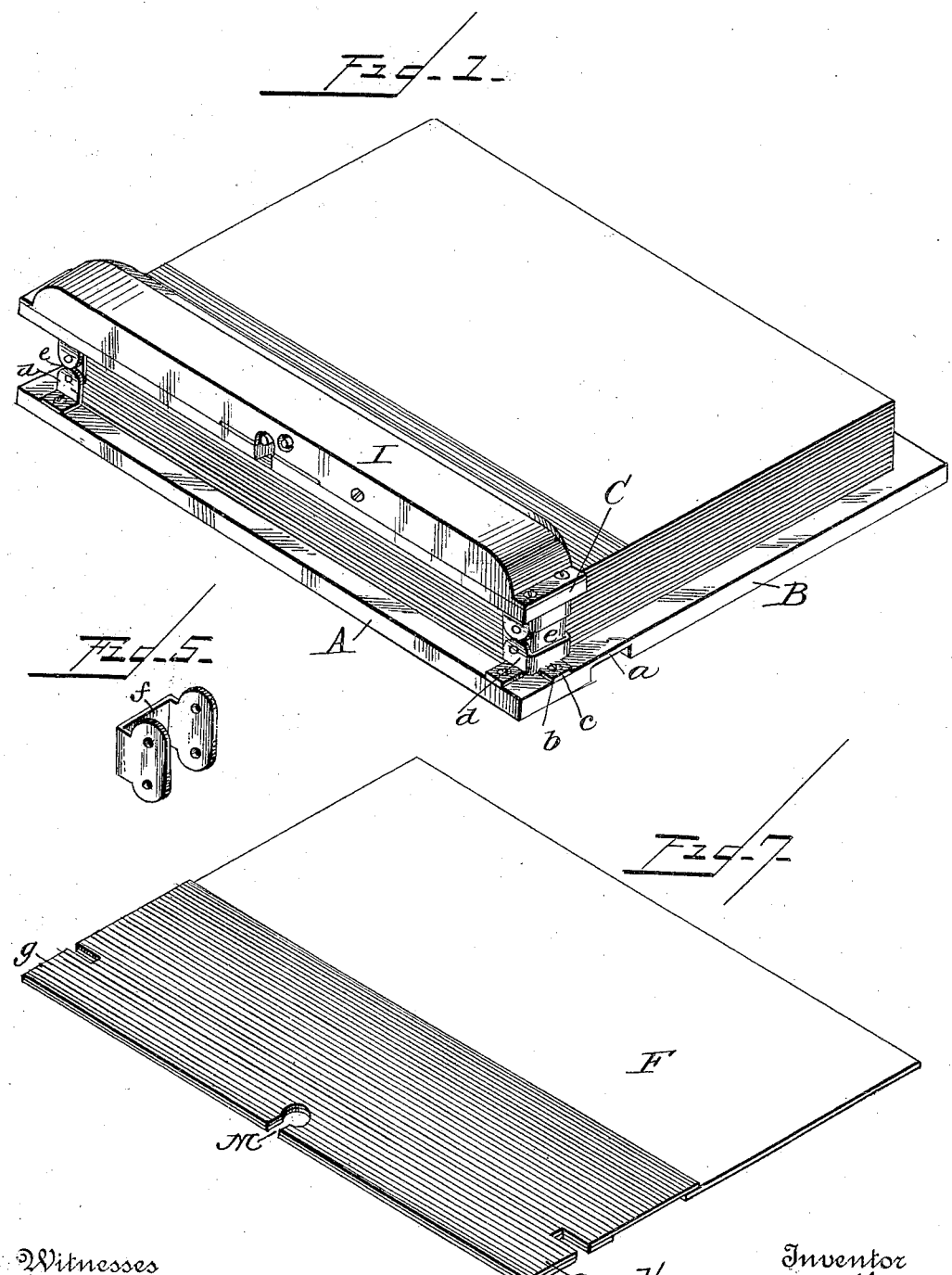
Witnesses
F. L. Ourand
Gales P. Moore
Inventor
Herman H. Hoffmann
By C. S. Sturtevant
Attorney

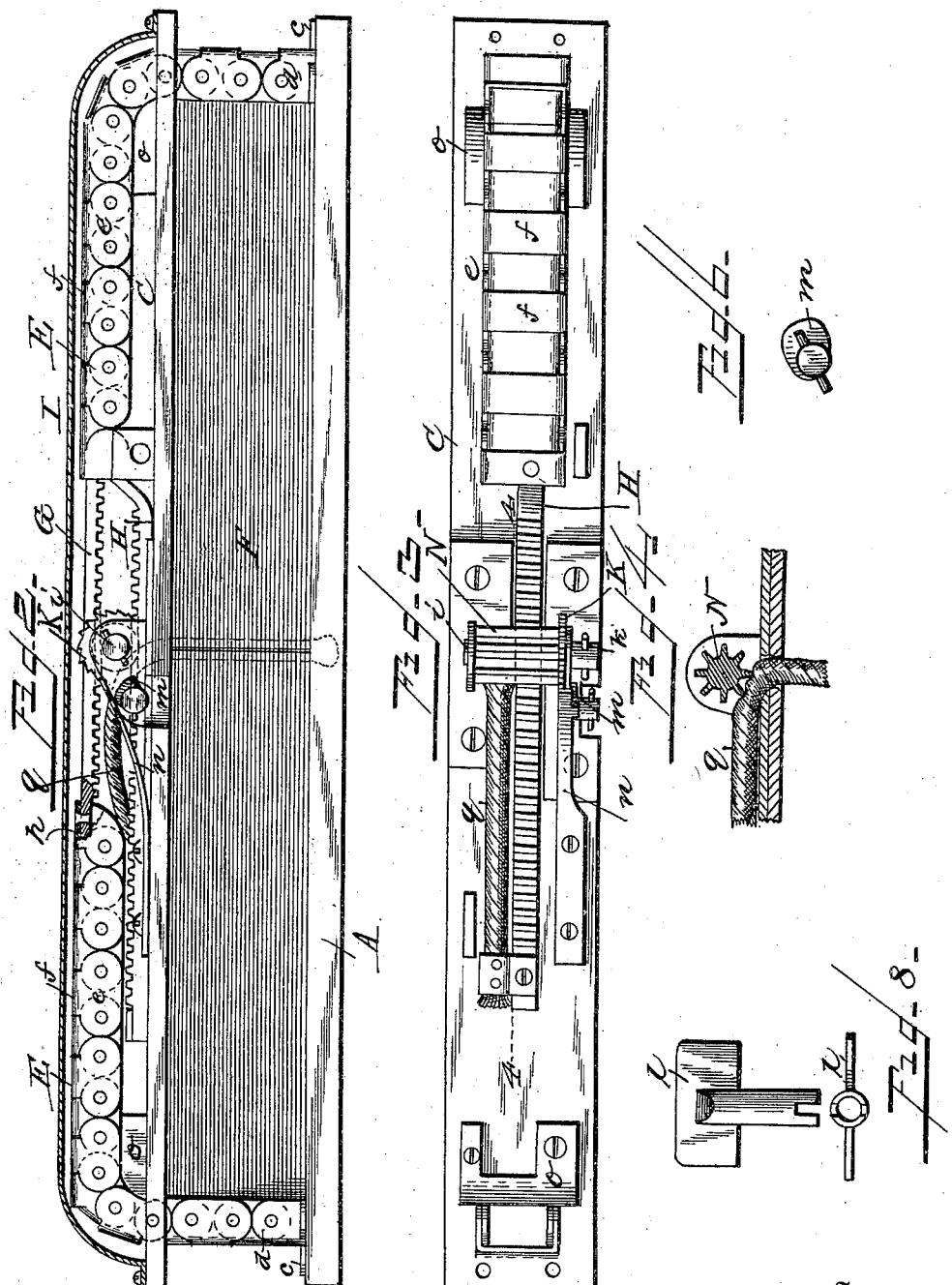

No. 690,859. Patented Jan. 7, 1902.
H. H. HOFFMANN.
BINDER.
(Application filed Aug. 23, 1897. Renewed Aug. 29, 1901.)
(No Model.) 5 Sheets—Sheet 3.
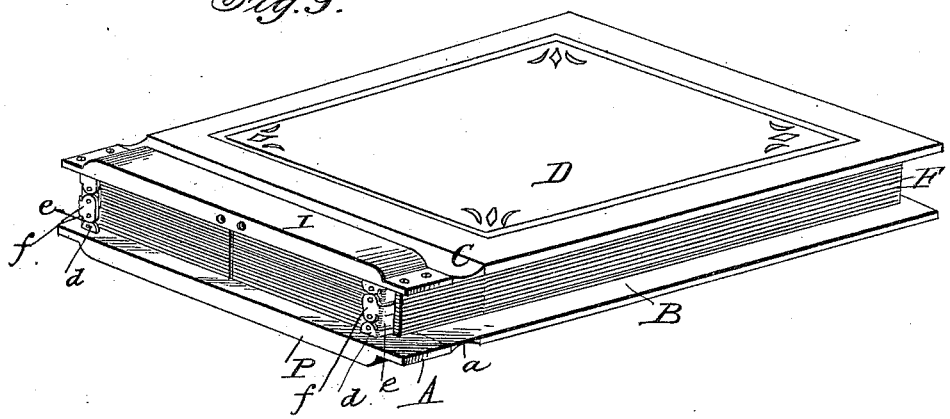
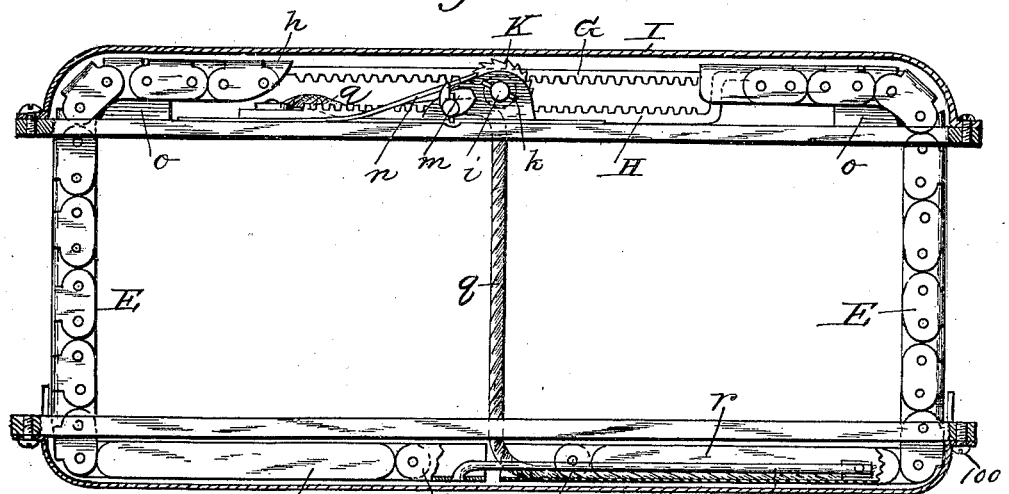
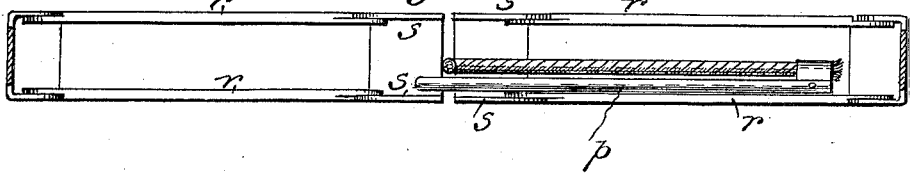
Witnesses
Inventor
Herman H. Hoffmann
Attorney No. 690,859. Patented Jan. 7, 1902.
H. H. HOFFMANN.
BINDER.
(Application filed Aug. 23, 1897. Renewed Aug. 29, 1901.)
(No Model.) 5 Sheets—Sheet 4.
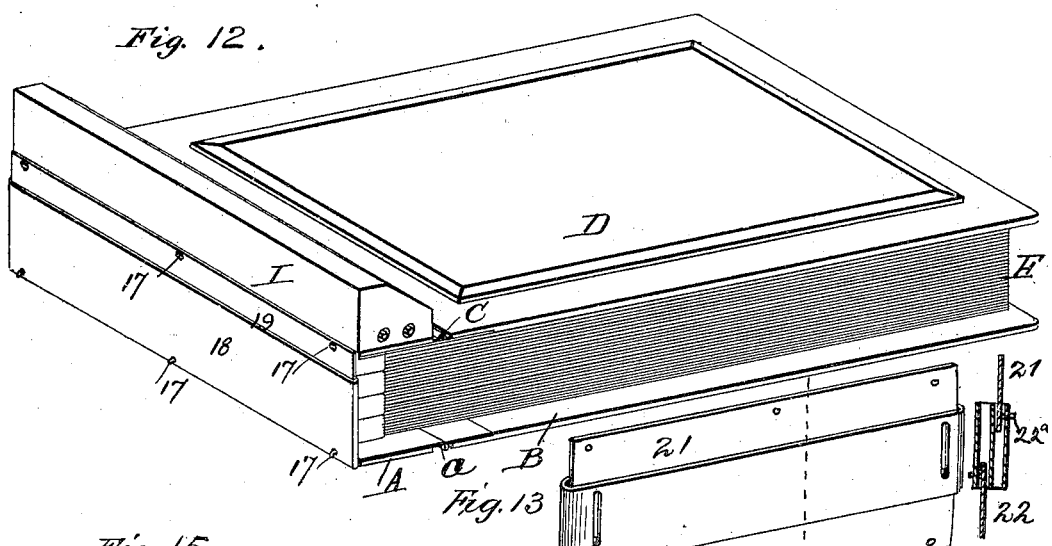
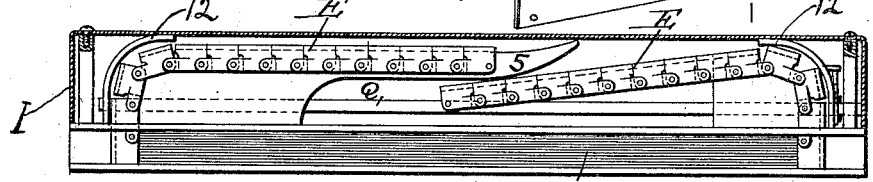
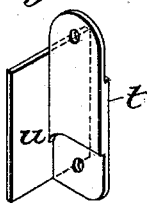
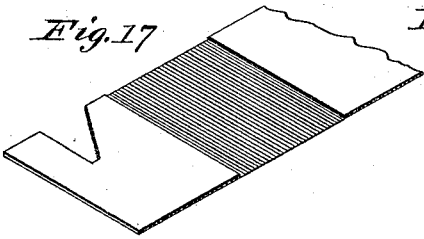
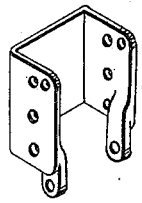
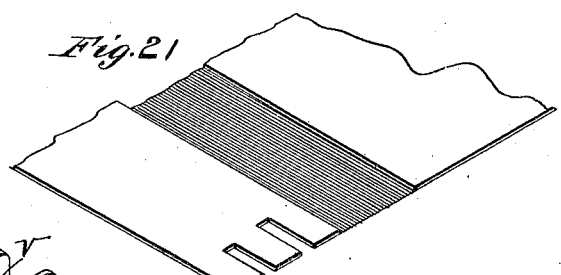
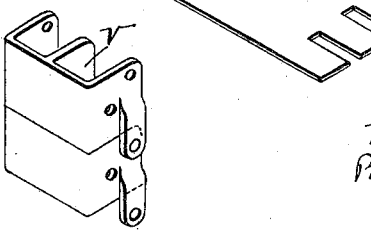
Witnesses. Inventor
Herman H. Hoffmann
By C. L. Sturtevant
Atty.
THE NORRIS PETERS CO., PHOTO-LITHO., WASHINGTON, D. C.

No. 690,859. Patented Jan. 7, 1902.
H. H. HOFFMANN.
BINDER.
(Application filed Aug. 23, 1897. Renewed Aug. 29, 1901.)
(No Model.) 5 Sheets—Sheet 5.

Witnesses.

Inventor
Herman H. Hoffmann
By C. S. Sturtevant
Att'y.

UNITED STATES PATENT OFFICE.

HERMAN H. HOFFMANN, OF CHICAGO, ILLINOIS.

BINDER.

SPECIFICATION forming part of Letters Patent No. 690,859, dated January 7, 1902.

Application filed August 23, 1897. Renewed August 29, 1901. Serial No. 73,696. (No model.)

*To all whom it may concern:*

Be it known that I, HERMAN H. HOFFMANN, a citizen of the United States, residing at Chicago, in the county of Cook, State of Illinois, have invented certain new and useful Improvements in Binders, of which the following is a description, reference being had to the accompanying drawings, and to the letters and figures of reference marked thereon.

The present invention relates to an improvement in binders, which while adapted for use as a permanent binder for leaves is preferably designed to be used in connection with flat-opening leaves, which may be readily removed and replaced by new ones, the binder being then firmly locked upon the leaves, forming a complete flat-opening book. This form of binder may also be used as a transfer-binder for the storing away of leaves which have been filled. A binder of this general character was patented to me on the 22d day of September, 1896, No. 568,251, and in the statement of invention of the said patent I referred generally to the state of the art as it existed prior to the time of the filing of the application upon which said patent was granted and pointing out the difficulties heretofore existing in the use of the said devices. In said patent I showed, described, and claimed a new form of temporary and transfer binder designed especially for flat-opening leaves, the said binder consisting of the base member and a binding member having vertical movement relative to each other, with vertical casings located between said members and provided with recesses constructed to receive and protect the lateral projections formed on the rear side edges of the leaves to be inserted in the binder. I have experienced difficulty with this device as well as with others existing prior thereto in that it is difficult to securely lock in place a small number of leaves, the minimum number being from one hundred to one hundred and fifty. It will be seen, therefore, that for this reason it is impracticable to use the device as a transfer-binder for the storing away of leaves which have been filled out except when the said leaves have reached this minimum number.

It is the object of the present invention to do away with these difficulties heretofore existing and provide a device which may securely lock and hold in place any number of leaves, and therefore may be used either as a flat-opening book with removable leaves or as a binder to which the filled-out leaves may be transferred.

To accomplish these objects, the invention consists, primarily, in a temporary binder having a base-piece and a binding member with flexible vertical casings located between the members and having recesses constructed to receive and protect lateral projections or shoulders on the rear side edges of the leaves to be inserted in the binder; and finally the invention comprises various matters hereinafter described, and referred to in the appended claims.

Figure 23:
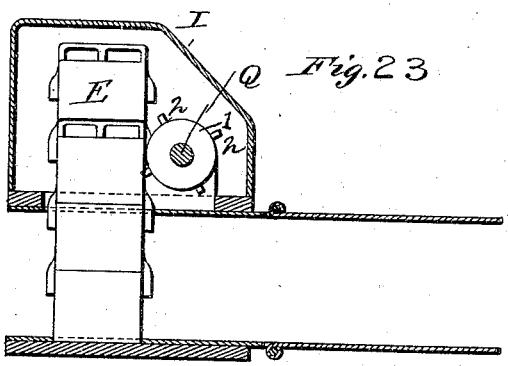
Figure 24:
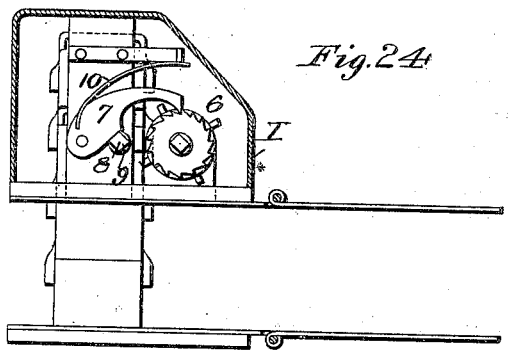
Figure 25:
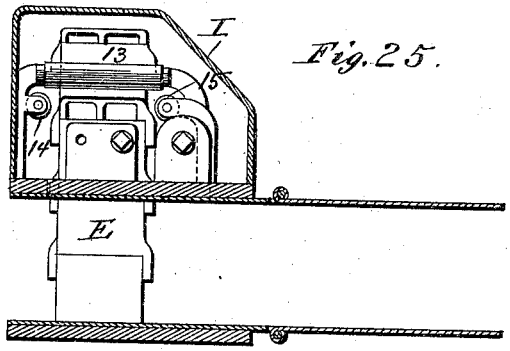
Figure 26:
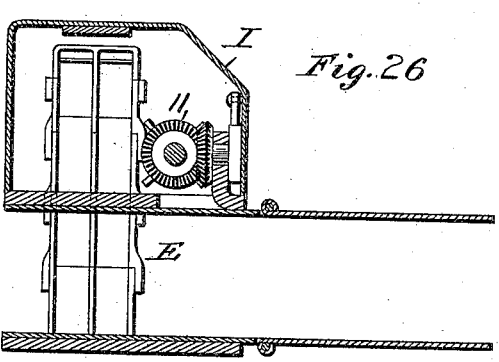

In the accompanying drawings, Figure 1 is a perspective view of a binder embodying my invention. Fig. 2 is a rear view, partly in section. Fig. 3 is a top plan view of the rear portion of the binder with the upper inclosing casing removed. Fig. 4 is a detail sectional view on the line 4 4 of Fig. 3. Fig. 5 is a detail view of one of the coupling-links of the flexible binding-chain. Fig. 6 is a detail view of the locking-cam. Fig. 7 is a perspective view of the preferred form of leaf which I intend to use in my improved binder. Fig. 8 is a detail view of the key which locks and unlocks the binder and also manipulates the flexible chain. Fig. 9 is a perspective view showing a complete book with the top and bottom covers in place, this figure showing another form of binder, in which a certain amount of the flexible chain may be stored in the lower part of the casing, this being intended for use where the pages of the book are very narrow and there would not be room in one casing above to store all the chain required. Fig. 10 is an enlarged sectional view of Fig. 9. Fig. 11 is a sectional top plan view of the lower casing. Fig. 12 is a perspective view of another form of book embodying my invention. Figs. 13 and 14 are perspective and sectional views, respectively, of a removable back designed for my binder. Fig. 15 is a sectional rear view of Fig. 12. Figs. 16 to 21, inclusive, represent various forms of links with leaves corresponding therewith. Fig. 22 is an enlarged view, partly in section, looking from the front of the book shown in Fig. 12 on one side thereof. Fig. 23 is a sectional end view of Fig. 12. Fig. 24 is a similar view showing the locking mechanism. Fig. 25 is a view similar to Fig. 23, showing antifriction guide-rollers for guiding and tumbling the links. Fig. 26 is a sectional view illustrating an alternative arrangement for operating the flexible links.

In the drawings the preferred form of book which I use for the ordinary large flat-opening ledgers is shown in Figs. 1, 2, and 3, while in Figs. 9, 10, and 11 is shown an arrangement which I prefer where the leaves of the book are comparatively narrow and not enough chain to accommodate the thickness of the book can be stored in one casing or chamber.

A represents the base-piece, preferably of metal, and to which is attached the lower cover B, preferably by means of a flexible connection $a$, the metallic piece A, cover B, and flexible connection between them being all covered with canvas in the usual way.

C represents the upper or binding piece, to which is secured the upper cover D.

Fastened to the base-piece A, upon either side of the rear edge thereof, by means of screws $b$, passing through ears $c$, is the lower end of a flexible chain, (represented as a whole in Figs. 2, 10, 15, and 22 by letter E,) the lowest link of which flexible chain is shown at $d$ and is provided with the ears $c$, heretofore mentioned. To this rigid link is pivoted a link $e$, this said link $e$ being pivoted to a coupling-link $f$, this coupling-link being shown clearly in Fig. 5 and forming the couplings between any two members $e$ of the chain. These links $e$, together with the coupling-links $f$, form when in position practically a three-sided casing, within which the rear side edges or shoulders $g$ on the leaves F are inserted and fully protected. The upper link on the flexible chain—as shown, for example, at $h$, Figs. 2 and 10—has attached to it a rack G, there being also a similar arrangement of chain and rack upon the opposite rear edge of the base and binding pieces, except that the teeth on the rack G extend downwardly, while those on the opposite side H extend upwardly. The chains are inclosed within a casing I, attached to the top binding-piece, this casing being of size sufficient to store away such upper links of the flexible chain as may happen not to be in use.

To manipulate the chains, there is supported on the binding member a shaft $i$, the shank $k$ of which is adapted to be engaged by a key $l$. This shaft is provided with teeth which engage the rack-bars G H and move the same in the direction of their length across the binding-piece, and thereby raise or lower the binding-piece by expanding or retracting the chains—that is, by turning the key to the left the binding-piece is raised and the chains straightened out to a vertical position, thus allowing of the insertion or removal of any number of leaves. In the opposite movement of the rack the chains are drawn into the casing I and stored. To provide for locking the binder, a cam, as shown in Fig. 6, is used, this cam $m$ being constructed to act upon a spring-pawl $n$, which engages the teeth on a ratchet-wheel K on the shaft $i$. When this pawl is unlocked from engagement with the teeth on the ratchet-wheel, the binding member may be manipulated in either direction; but upon operating the cam $m$ to cause the pawl to engage the ratchet-teeth all upward movement of the binding member is prevented, thus effectually stopping any unauthorized persons from removing leaves from the binder. In order to still further set the leaves F and prevent their wabbling in the casings, I provide them with a central recess M, through which passes a wire rope $q$ or some other flexible device, which is attached at its lower end to the base-piece A and at its opposite end to the end of the rack H, and it is also preferably engaged by the teeth on the wheel N, as shown in Fig. 4. The curved lugs $o$ (shown in Figs. 2 and 3) serve to guide and help tumble the flexible chain.

In Figs. 9, 10, and 11 I have shown an arrangement which it is designed to use where the book is of such dimensions that it is not practicable, without greatly increasing the size of the upper casing, to store all the links which it is desired to use. In these figures in addition to the arrangements heretofore described in connection with the upper casing there is provided a lower casing P, to which a lower or base piece is secured, and within this lower casing are arranged a series of flexible links, one of which has a rod $p$ extending out from its end and having secured to it the lower end of the flexible rope $q$. Although I have not shown the same in these figures, yet it will be understood that these reserve links, which are stored in the bottom casing of the binder, may be provided with manipulating means similar to those described in connection with the links that are stored in the upper casing. Instead of arranging in this lower casing a series of links similar to those above, which would obviously be within the scope of my invention, I prefer to use in the said lower part of each side a long two-and-one-half-inch link, as shown at $r$, and a short end link $s$, which when it is tipped over within the lower casing would hold the long link in place. When this long link is used in the bottom casing instead of the series of short ones, it will be readily seen that there will not be room enough by the ordinary manipulating-key, as above described, to tip the long link and force it up through the base member, and it will therefore be necessary to provide simple means, such as set-screws 100, for unlocking the lower casing and forcing the long links up through the same, the latter acting as the vertical casings to protect the rear edges of the leaves until all their length has been occupied, and then the short flexible links will come into play again.

In Figs. 12 and 15 of the drawings and also in Figs. 22 to 26 are shown different forms of binders embodying the broad principles of my invention, while in Figs. 16 to 20 are shown various forms of leaves and pivoted links. For example, in Fig. 16 the pivoted links are shown as having broad rear edges and having a thin or angular extending piece $t$, which fits in the notch formed in the rear side edge of the leaf to be inserted in the binder, this leaf being shown in Fig. 17, the broad rear edge $u$ of the link acting to protect the rear side edge of the leaf. In Fig. 18 the form of link is very much like that shown in Fig. 5 of the drawings and the leaf used therewith is substantially the same as leaf F, (shown in Fig. 7,) this leaf being shown in Fig. 19. In Fig. 20 the link is of the general shape shown in Fig. 18, except that it has a central fin $v$, and the leaf designed to be used in connection therewith will have two notches or cuts arranged in its rear side edge, as shown in Fig. 21.

Referring now to Figs. 12 and 15, upon the top member or binding-piece C is hinged or otherwise attached a box or casing I, of size sufficient to store away the upper links of the flexible chain which are not in use. As shown in Figs. 15 and 22, there passes through the lower part of this casing or box I a horizontal shaft Q, carrying near either end a wheel or disk 1, provided with lugs 2, adapted to successively engage the holes 3, coned in one side of the pivoted links, whereby in the rotation of said shaft in one direction or the other the links are raised or lowered. Of course means must be provided to allow those links which are to be stored in the box or casing to pass each other, and in said Fig. 15 a guiding-plate 5 guides the links on one side above the plate, while on the other side said links fall to the bottom of said box or casing in the manner illustrated in said Fig. 15.

The preferred means of manipulating the shaft Q, as well as for locking it against movement, is shown in detail in Figs. 22 and 24. In these said shaft is extended through one end of the casing and is provided with a portion adapted to be engaged by a wrench or key. Within the casing and located adjacent the wheel which locates the flexible links on one side is a ratchet-wheel 6, which engages a pawl 7, which pawl locks said ratchet-wheel firmly in place and is movable by means of a dog 8, provided with a key-shaft 9. The pawl is held normally in engagement with the ratchet by means of a leaf-spring 10; but upon manipulation of the key the dog throws out the ratchet-pawl and the shaft may be turned. In Fig. 26 the rotation of the shaft is accomplished by providing thereon a beveled gear 11, which is in mesh with another beveled gear manipulated from the front of the casing by means of a suitable key. Furthermore, it will be understood that other means for manipulating the shaft may be provided, or chains running over sprocket-wheels may be used to move the links up and down.

As shown in Figs. 22 and 15, the links are tumbled over and guided by means of a curved plate 12, attached to the upper member of the binder; but, as shown in Fig. 25, this may be dispensed with, and instead thereof antifriction guiding-rollers 13, 14, and 15 may be used, the roller 13 acting to guide and tumble the links, while the rollers 14 and 15 guide the sides thereof and prevent any sidewise or wabbling movement of the chain while it is in motion.

To protect the rear edges of the leaves within the binder, I provide the arrangements shown in Figs. 12, 13, and 14. In Fig. 12 a number of hooks 17 are attached at the top and bottom, inside the binding-pieces, and to the hook or hooks on the base-piece eyeleted double boards 18, about three inches in height, are provided, and upon the hooks of the top member a second piece of pasteboard 19, which slides between the double-boards 18, the two together forming a back for the ledger or other book or transfer-binder, in case it be used as such.

In Figs. 13 and 14 another arrangement for protecting the back of the book is shown in which a central part of tin or leather is provided, having two pockets, in which pockets telescope tin or leather pieces 21 and 22. These pieces 21 and 22 are attached to the top and bottom members, respectively, if desired, by the hooks 17. This casing is supported by the two pieces 21 and 22—*i. e.*, said two pieces are guided therein, and the movement thereof is limited, so that the said central piece does not lose its engagement therewith. A way of making this is to provide each of the sliding pieces with stops $22^a$, which prevent their being withdrawn from the respective recesses.

It will be understood that while I have shown as a means for manipulating the rack-bars which are attached to the chains a wheel N, provided with teeth extending throughout its entire length, this wheel perhaps being more properly termed a "roller," still it will be understood that instead of providing it with teeth and the bars with racks said roller may be provided with lugs or sprockets engaging openings in the bars G H, and in the claims I consider the terms "roller" and "wheel" to be practically interchangeable, and wherein I mention that "the roller is provided with teeth operatively engaging the flexible chains" I mean to cover not only the construction shown in Figs. 1, 2, and 3, but also the wheel 1, provided with lugs engaging holes in the links. This is shown in Fig. 22.

It will be understood that various minor modifications and changes in the construction of the binder may be made without departing from the spirit of the invention and that I do not wish to be limited in any way to the details of construction of the locking means, the

Having thus described my invention, what I claim, and desire to secure by Letters Patent, is—

1. A binder comprising relatively movable base and top members and flexible binding means between the two members, said flexible binding means carrying casings adapted to receive and protect the rear side edges of the leaves to be inserted in the binder; substantially as described.

2. A binder comprising relatively movable base and top members and flexible vertical casings located between said members and having recesses constructed to receive and protect lateral projections on the rear side edges of the leaves to be inserted in the binder, substantially as described.

3. A binder comprising relatively movable base and top members and flexible binding means between the two members, said flexible binding means carrying casings adapted to receive and protect the rear side edges of the leaves to be inserted in the binder, with means carried by one of said members for operating the flexible binding means; substantially as described.

4. A binder comprising relatively movable base and top members and flexible binding means between the two members, said flexible binding means carrying casings adapted to receive and protect the rear side edges of the leaves to be inserted in the binder, with means carried by one of said members for operating the flexible binding means, and means for locking the same in any position; substantially as described.

5. A binder comprising relatively movable base and top members with means for drawing the same toward and from each other, comprising flexible chains adapted to engage the leaves to be inserted in the binder, means for operating the chains comprising a rotating part operatively engaging the chains, and a casing upon one of the members within which the unused portions of the chains and also the operating means may be stored, substantially as described.

6. A binder comprising top and base members relatively movable, and means for engaging the leaves to be inserted between the members, said means comprising a series of pivoted casings with mechanism for operating the same; substantially as described.

7. A binder comprising top and base members relatively movable, flexible links provided with means for engagement with the leaves to be inserted in the binder, and a rotating wheel provided with projections operatively connected with said links to move the same; substantially as described.

8. A binder comprising top and base members relatively movable, flexible links provided with means for engagement with the leaves to be inserted in the binder, a rotating wheel provided with projections operatively connected to said links, and means for locking said wheel against rotation; substantially as described.

9. A binder comprising flexible links adapted to engage the leaves to be inserted in the binder, means for engaging said links to move the same, and means for guiding and tumbling said links; substantially as described.

10. A binder comprising relatively movable top and base members, a rotating shaft carrying a toothed wheel and journaled on one of said members, flexible chains for guiding and holding the rear side edges of the leaves to be bound, each of said chains being provided with a rack engaging one the upper and one the lower periphery of said wheel; substantially as described.

11. A temporary binder comprising relatively movable base and top pieces, flexible chains each adapted to receive and protect the rear side edges of the leaves to be bound in the binder and a toothed roller which is operatively connected with the flexible chains; substantially as described.

12. A binder comprising relatively movable base and top pieces, a casing carried by the upper piece, a flexible chain secured to the base-piece and extending upwardly into the casing, a rack-bar secured to the upper end of each of said chains, one rack-bar having downwardly and the other upwardly projecting teeth and a toothed roller engaging said teeth for moving the rack simultaneously in opposite directions; substantially as described.

13. A binder comprising base and top pieces relatively movable toward and from each other and each provided with a casing, flexible chains extending between the top and base pieces and means for manipulating the said chains, whereby they may be stored in the top and bottom casings as desired; substantially as described.

14. A binder comprising top and bottom members relatively movable toward and from each other, flexible chains extending between the two and adapted to receive and protect the rear side edges of the leaves to be inserted in the binder means for manipulating the said chains and a centrally flexible cord or rope also engaging recesses in the leaves and means for extending or relaxing said rope as the top and bottom members are moved relatively away from or toward each other; substantially as described.

15. In the herein-described binder, the flexible chains and the flexible cord movable by the same mechanism which moves the chains, substantially as described.

16. As an extension-back for temporary binders, a centrally-recessed member and upper and lower members telescoping within the recesses of said central member; substantially as described.

17. A binder, comprising relatively movable base and top members, and flexible extensible binding means between the two members, said flexible extensible binding means being formed to receive and protect the rear side edges of the leaves to be inserted in the binder; substantially as described.

In testimony whereof I affix my signature in presence of two witnesses.

HERMAN H. HOFFMANN.

Witnesses:
W. G. LEMAY,
J. IRA COLLINS.